US009581097B2

(12) United States Patent
Younkins et al.

(10) Patent No.: US 9,581,097 B2
(45) Date of Patent: Feb. 28, 2017

(54) DETERMINATION OF A HIGH PRESSURE EXHAUST SPRING IN A CYLINDER OF AN INTERNAL COMBUSTION ENGINE

(71) Applicant: Tula Technology Inc., San Jose, CA (US)

(72) Inventors: Matthew A. Younkins, San Jose, CA (US); John W. Parsels, San Jose, CA (US); Joel D. Van Ess, Campbell, CA (US); Siamak Hashemi, Farmington Hills, MI (US)

(73) Assignee: Tula Technology, Inc., San Jose, CA (US)

( * ) Notice: Subject to any disclaimer, the term of this patent is extended or adjusted under 35 U.S.C. 154(b) by 294 days.

(21) Appl. No.: 14/582,008

(22) Filed: Dec. 23, 2014

(65) Prior Publication Data

US 2015/0192080 A1 Jul. 9, 2015

Related U.S. Application Data

(60) Provisional application No. 61/925,157, filed on Jan. 8, 2014, provisional application No. 62/002,762, filed on May 23, 2014.

(51) Int. Cl.
*G01M 15/04* (2006.01)
*F02D 41/00* (2006.01)
*F02P 17/12* (2006.01)

(52) U.S. Cl.
CPC .......... *F02D 41/0087* (2013.01); *F02P 17/12* (2013.01); *F02D 2041/0012* (2013.01); *F02P 2017/123* (2013.01)

(58) Field of Classification Search
USPC ............... 73/114.02, 114.16, 114.19, 114.58, 73/114.62, 114.79
See application file for complete search history.

(56) References Cited

U.S. PATENT DOCUMENTS

| | | | |
|---|---|---|---|
| 4,434,767 | A | 3/1984 | Kohama et al. |
| 4,489,695 | A | 12/1984 | Kohama et al. |
| 4,509,488 | A | 4/1985 | Forster et al. |
| 5,377,631 | A | 1/1995 | Schechter |
| 5,747,670 | A | 5/1998 | Takahashi et al. |
| 6,158,411 | A | 12/2000 | Morikawa |
| 6,619,258 | B2 | 9/2003 | McKay et al. |
| 7,063,062 | B2 | 6/2006 | Lewis et al. |
| 7,066,136 | B2 | 6/2006 | Ogiso |
| 7,086,386 | B2 | 8/2006 | Doering |
| 7,314,034 | B1 | 1/2008 | Waters et al. |
| 7,357,019 | B2 | 4/2008 | McDonald et al. |
| 7,503,312 | B2 | 3/2009 | Surnilla et al. |
| 7,546,827 | B1 | 6/2009 | Wade et al. |
| 7,762,237 | B2 | 7/2010 | Gibson et al. |
| 7,854,215 | B2 | 12/2010 | Rozario et al. |
| 7,900,509 | B2 | 3/2011 | Feldkamp et al. |
| 7,908,913 | B2 | 3/2011 | Cinpinski et al. |
| 7,921,709 | B2 | 4/2011 | Doering et al. |

(Continued)

*Primary Examiner* — Eric S McCall
(74) *Attorney, Agent, or Firm* — Bever Law Group LLP

(57) ABSTRACT

A variety of methods and arrangements for determining whether a high pressure exhaust spring is present in a cylinder of an internal combustion engine are described. For spark ignition engines, the electrical properties of the spark plug spark gap may be used to determine whether a high pressure exhaust spring is present.

19 Claims, 10 Drawing Sheets

(56) References Cited

U.S. PATENT DOCUMENTS

| | | | | |
|---|---|---|---|---|
| 7,930,087 | B2 | 4/2011 | Gibson et al. | |
| 8,006,670 | B2 | 8/2011 | Rollinger et al. | |
| 8,091,412 | B2 | 1/2012 | Forte et al. | |
| 8,099,224 | B2 | 1/2012 | Tripathi et al. | |
| 8,103,433 | B2 | 1/2012 | Hartmann et al. | |
| 8,181,508 | B2 | 5/2012 | Cinpinski et al. | |
| 8,286,471 | B2 | 10/2012 | Doering et al. | |
| 8,301,362 | B2 | 10/2012 | Buslepp et al. | |
| 8,631,688 | B1 | 1/2014 | Rayl et al. | |
| 8,666,641 | B2 | 3/2014 | Rollinger et al. | |
| 8,667,835 | B2 | 3/2014 | Doering et al. | |
| 8,826,891 | B2 | 9/2014 | Nishikiori et al. | |
| 2006/0129307 | A1 | 6/2006 | Yasui | |
| 2010/0031738 | A1 | 2/2010 | Feldkamp et al. | |
| 2010/0050993 | A1 | 3/2010 | Zhao et al. | |
| 2010/0154738 | A1 | 6/2010 | Tsukamoto et al. | |
| 2010/0175462 | A1 | 7/2010 | Doering et al. | |
| 2011/0167900 | A1 | 7/2011 | Zanotti et al. | |
| 2013/0325290 | A1 | 12/2013 | Pierik | |
| 2014/0261309 | A1* | 9/2014 | Chen | F02D 41/0082 123/320 |
| 2015/0233289 | A1* | 8/2015 | Younkins | F02B 77/082 73/114.79 |
| 2016/0024981 | A1* | 1/2016 | Parsels | F02D 41/0087 123/90.11 |
| 2016/0109330 | A1* | 4/2016 | Chen | F02D 35/024 73/114.05 |
| 2016/0116371 | A1* | 4/2016 | Chen | F02M 35/1038 73/114.37 |

* cited by examiner

DETERMINATION OF A HIGH PRESSURE EXHAUST SPRING IN A CYLINDER OF AN INTERNAL COMBUSTION ENGINE

CROSS-REFERENCE TO RELATED APPLICATIONS

This application claims priority to U.S. Provisional Patent Application No. 61/925,157, filed Jan. 8, 2014, which is hereby incorporated herein by reference in its entirety for all purposes. This application also claims priority to U.S. Provisional Patent Application No. 62/002,762, filed May 23, 2014, which is incorporated herein by reference in its entirety for all purposes.

FIELD OF THE INVENTION

The present invention relates to determination of a high pressure exhaust spring in a cylinder of an internal combustion engine. The invention is particularly useful in verifying correct operation of the intake and exhaust valves of an internal combustion engine using skip fire control.

BACKGROUND

Fuel efficiency of internal combustion engines can be substantially improved by varying the displacement of the engine. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of ⅓$^{rd}$ of the full engine displacement, which is a fractional displacement that is not obtainable by simply deactivating a set of cylinders.

U.S. Pat. No. 8,131,445 (which is incorporated herein by reference) teaches a continuously variable displacement engine using a skip-fire operational approach, which allows any fraction of the cylinders to be fired on average using individual cylinder deactivation. In a continuously variable displacement mode operated in skip-fire, the amount of torque delivered generally depends heavily on the firing fraction, or fraction of combustion events that are not skipped. In other skip fire approaches a particular firing pattern or firing fraction may be selected from a set of available firing patterns or fractions.

In order to operate with skip fire control it is desirable to control the intake and exhaust valves in a more complex manner than if the cylinders are always activated. Specifically the intake and/or exhaust valves need to remain closed during a skipped working cycle to minimize pumping losses. This contrasts with an engine operating on all cylinders, where the intake and exhaust valves open and close on every working cycle. For cam operated valves a method to deactivate a valve is to incorporate a solenoid controlling a collapsible valve lifter into the valve train. To activate the valve the lifter remains at its full extension and to deactivate the valve the lifter is collapsed. Other mechanisms exist to deactivate valves in engines with cam operated valves. Engines with electronic valve actuation generally have more flexibility in the valve opening and closing because the valve motion is not constrained by rotation of a camshaft.

If cylinder deactivation occurs after a combustion event but prior to an exhaust event, all of the exhaust remains in the cylinder during the duration of deactivation. This condition may be referred to as the cylinder having a high pressure exhaust spring (HPES) in the cylinder. If instead, the cylinder deactivation occurs after the exhaust valve has opened but before the intake valve is opened, only a small residual charge remains in the cylinder. This condition may be referred to as the cylinder having a low pressure exhaust spring (LPES).

A potential problem with skip fire control is that if for some reason the exhaust gases associated with a cylinder firing have not been vented from the cylinder attempting to open the intake valve may damage the valve, push rod, lifter or any component in the valve train because of the high pressure contained in the cylinder. It is desirable if a determination of whether a cylinder has vented can be made prior to activation of the intake valve.

SUMMARY

A variety of methods and devices for determining whether a high pressure exhaust spring exists in a cylinder of an internal combustion engine are described. In one embodiment the determination is made by measuring the electrical properties of a spark plug spark gap. In some implementations, these electrical measurements may be made at a time substantially corresponding to a top dead center position of a piston within the cylinder, although this is not a requirement. Additional electrical measurements may be made at other times. In other embodiments, additional sensors can be used either individually or in cooperation with measurement of the spark gap electrical properties to determine whether a high pressure spring exists in a cylinder. These sensors include an intake manifold absolute pressure sensor, an intake manifold flow sensor, an exhaust gas oxygen sensor, a crankshaft rotation sensor, a camshaft rotation sensor, and an exhaust gas flow sensor.

In some embodiments, a signal indicating the presence of a high pressure exhaust spring will result in deactivation of the intake valve so it remains closed. In other embodiments, presence of a high pressure exhaust spring signal will cause the exhaust valve to open venting the exhaust gases from the cylinder. In some embodiments, a signal indicating the presence of a low pressure exhaust spring will result in activation of the intake valve so it can be opened.

Some implementations involve a control system for an internal combustion engine. The engine is operated in a skip fire manner and includes multiple cylinders. Each cylinder has at least one intake valve and at least one exhaust valve. The control system is arranged to perform any of the aforementioned operations or methods. In some embodiments, the control system includes an electrical circuit that is arranged to generate a test spark across a spark gap in a cylinder. In various embodiments, the electrical circuit outputs signals that help indicate electrical properties of the spark gap. The control system also includes a cylinder control module that is arranged to measure one or more electrical properties of the spark gap to determine whether a high pressure spring exists in the cylinder. In some implementations, the cylinder control module may control one or more intake and/or exhaust valves based on the measured electrical properties.

BRIEF DESCRIPTION OF THE DRAWINGS

The invention and the advantages thereof, may best be understood by reference to the following description taken in conjunction with the accompanying drawings in which:

FIGS. 7(*b*) and 7(*c*) are signal waveforms according to one embodiment of the present invention.

In the drawings, like reference numerals are sometimes used to designate like structural elements. It should also be appreciated that the depictions in the figures are diagrammatic and not to scale.

DETAILED DESCRIPTION

The present invention relates to determination of a high pressure exhaust spring in a cylinder of an internal combustion engine. The invention is particularly useful in verifying correct operation of the intake and exhaust valves of an internal combustion engine using skip fire control. In various embodiments, the electrical properties of the spark gap are determined by an auxiliary circuit. Detection of a high pressure exhaust spring may cause the exhaust valve to open and/or disable activation of the intake valve.

Figure 1:
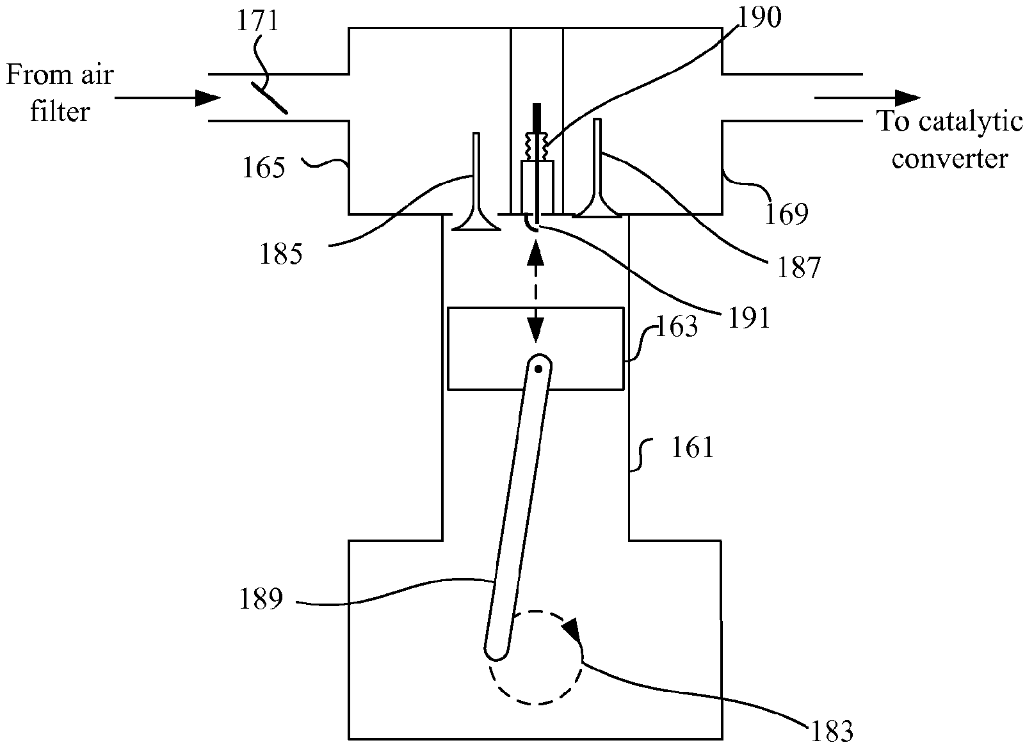
FIG. 1 is a schematic diagram showing a portion of one cylinder of an exemplary internal combustion engine.

FIG. 1 illustrates an internal combustion engine that includes a cylinder 161, a piston 163, an intake manifold 165, spark plug 190, and spark gap 191 and an exhaust manifold 169. The throttle valve 171 controls the inflow of air from an air filter or other air source into the intake manifold. Air is inducted from the intake manifold 165 into cylinder 161 through an intake valve 185. Fuel is added to this air either by port injection or direct injection into the cylinder (not shown in FIG. 1). Combustion of the air/fuel mixture is initiated by a spark present in the spark gap 191. Expanding gases from combustion increase the pressure in the cylinder and drive the piston 163 down. Reciprocal linear motion of the piston is converted into rotational motion by a connecting rod 189, which is connected to a crankshaft 183. Combustion gases are vented from cylinder 161 through an exhaust valve 187.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. The fire/skip decision may be made on a firing opportunity by firing opportunity basis. This decision is typically made some number of firing opportunities prior to the firing event to allow the control system time to correctly configure the engine for either a skip or fire event. Skip fire control contrasts with conventional variable displacement engine operation in which a fixed set of the cylinders are deactivated during certain low-load operating conditions.

When a cylinder is deactivated in a variable displacement engine, its piston typically still reciprocates, however neither air nor fuel is delivered to the cylinder so the piston does not deliver any power during its power stroke. Since the cylinders that are "shut down" don't deliver any power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered during skipped working cycles. This requires a valve deactivation mechanism where the intake and exhaust valves of a cylinder remain closed during a working cycle. In this case, no air is introduced to the deactivated cylinders during the skipped working cycles thereby reducing pumping losses.

In a deactivated cycle the intake valve remains closed, so no air can flow from the intake manifold into the cylinder. Fuel is also disabled so that no fuel is supplied to the deactivated cylinder. This is particularly important in a direct injection engine where fuel is injected directly into the cylinder. The exhaust valve can also remain closed in a deactivated cylinder; however, if it is closed its closing timing relative to the intake valve closing is important. If the exhaust valve remains closed after a combustion event, high pressure exhaust gases are trapped in the cylinder forming a high pressure exhaust spring (HPES). This may be acceptable so long as the intake valve remains closed. If the exhaust valve is opened subsequent to the combustion event and then closed, exhaust gases are vented and the gas remaining in the cylinder is at low pressure, forming a low pressure exhaust spring (LPES).

Figure 2:
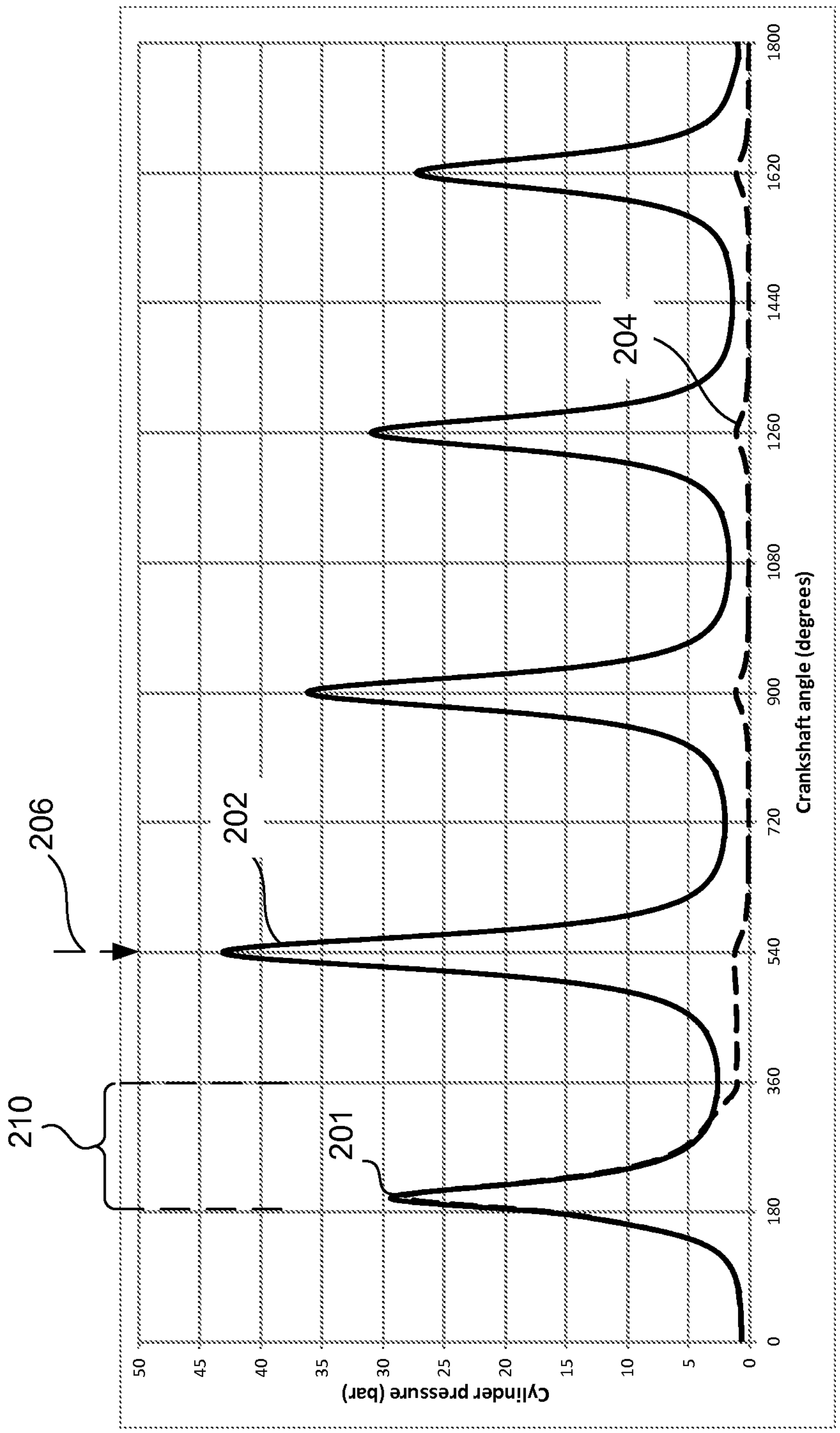
FIG. 2 is an exemplary plot showing the cylinder pressure for high and low pressure exhaust spring operation.

FIG. 2 shows the cylinder pressure versus time through multiple working cycles of a four-stroke internal combustion for the HPES and the LPES cases. A 4-cycle engine takes two crankshaft revolutions, 720 degrees, to complete a working cycle. On each working cycle the piston passes twice through the top dead center (TDC) position and twice through the bottom dead center (BDC) position. In FIG. 2 the horizontal axis is crankshaft angle and the vertical axis is cylinder pressure. A combustion event 201 occurs at a crank angle of approximately 180 degrees. Associated with the combustion event is a sharp increase in cylinder pressure. In one case, after the combustion event both the intake and exhaust valves remain closed forming a HPES. Curve 202 plots the cylinder pressure resulting with a HPES in the cylinder. In the other case, the exhaust valve opens after the combustion event forming a LPES. Curve 204 plots the cylinder pressure resulting with a LPES in the cylinder. As can be seen from inspection of FIG. 2 the cylinder pressure in the HPES case can exceed 40 bar at a crankshaft angle of approximately 540°. This compares to the LPES case where the cylinder pressure is always less than 2 bar after completion of the power stroke 210 following the combustion event 201. Subsequent TDC positions after 540 degrees have lower maximum pressure values for the HPES case 202, since the gases in the cylinder are cooling and there is some leakage of gas from the cylinder. The LPES case 204 is essentially identical between these successive TDC positions. FIG. 2 shows also shows the approximate timing of a test spark 206, whose purpose will be described below.

If the exhaust gases remain trapped in the cylinder forming a HPES, the intake valve or its associated mechanical mechanisms may be damaged by trying to open against the high pressure of the trapped combustion gases. If the cylinder were activated the intake valve would open at approximately the same time as the test spark 206 shown in FIG. 2. In the HPES this implies trying to open into a pressure exceeding 40 bar. Safe intake valve opening can only occur when the cylinder pressure is low, which is ensured if the cylinder has been vented through the exhaust valve prior to the intake. The embodiments below describe systems and methods for determining whether a high pressure spring is present in a cylinder. If a high pressure spring is detected the exhaust valve may be activated, venting the cylinder, to avoid activation of the intake valve against a high pressure spring.

Figure 3:
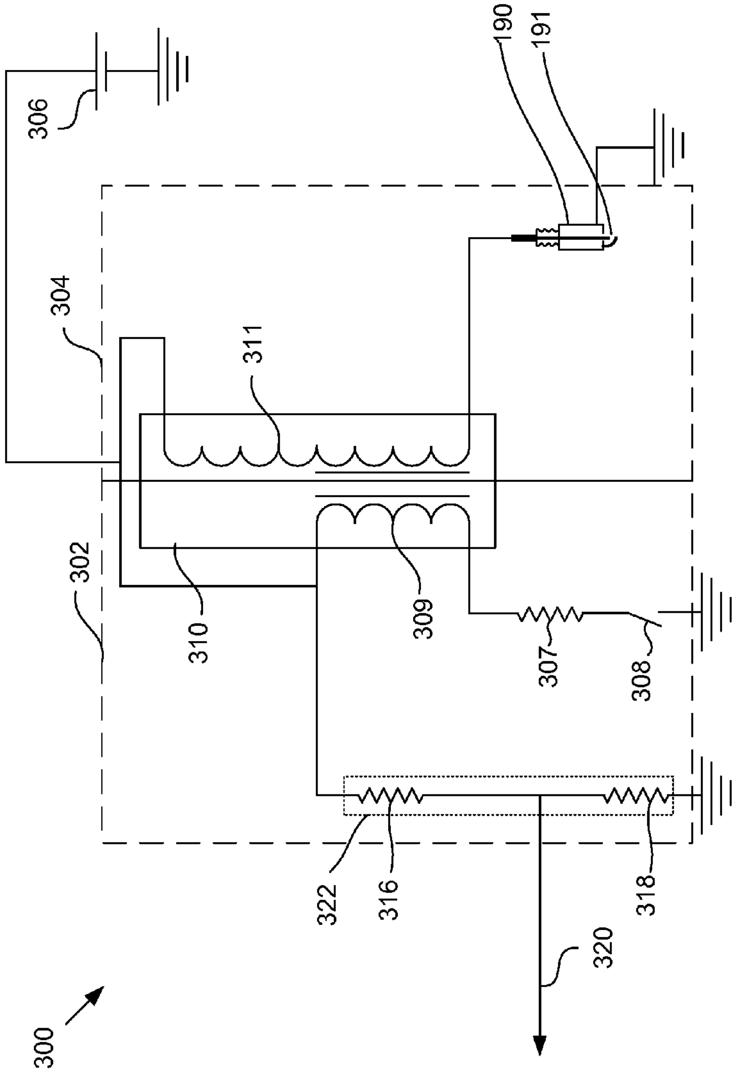
FIG. 3 is a simplified electrical schematic according to one embodiment of the present invention.

One method to determine whether a high pressure spring is present is to infer the conditions within the cylinder by monitoring the electrical properties of the gases present in the spark gap 191 (FIG. 1). An auxiliary electrical circuit, added to the normal electrical circuit used to drive the cylinder spark, may be employed to measure the electrical properties of the spark gap. FIG. 3 shows an exemplary electrical circuit 300 that may be used to both drive the cylinder spark and measure the electrical properties of the cylinder gases. Each cylinder in a multi-cylinder engine may be equipped with an electrical circuit identical or similar to simplified electrical circuit 300, although this is not a requirement and any suitable electrical circuit design may be used. Electrical circuit 300 can be divided into a primary section 302 and a secondary section 304. Both sections may operate off a low voltage DC supply voltage, such as may be supplied by a battery 306. A switch 308 controls current flow through the primary coil 309 of transformer 310. The switch may be a fast activating, solid state component such as a field effect transistor. Opening the switch 308 causes a rapid drop in the current through the primary coil 309 of transformer 310. This current may be limited by optional resistor 307, the resistance of the primary coil 309, or other factors. The sudden drop in current through primary coil 309 generates a high voltage on the secondary coil 311 of transformer 310. The high voltage appears across spark gap 191 of spark plug 190 causing electrical breakdown and generating a spark across the spark gap 191 that initiates combustion in cylinder 161 (FIG. 1). Also included in electrical circuit 300 is auxiliary circuit 322, which consists of a voltage dividing resistor pair, resistors 316 and 318. In this case the auxiliary circuit 322 is situated within the primary section 302, although this is not a requirement. The auxiliary circuit may be situated in secondary section 304 or in a location remote to primary section 302 and secondary section 304. The signal 320 allows monitoring of the voltage between resistors 316 and 318. The value of resistors 316 and 318 is chosen to be much larger than optional resistor 307 or the primary coil 309, so little current flows through this leg of the circuit. The ratio between resistor 316 and 318 may be chosen to provide a convenient level for the signal 320; for example, a maximum signal level somewhat less than the battery supply voltage 306. Signal 320 may be directed to an engine controller or some other control circuit (not shown in FIG. 3). Also incorporated into circuit 300, but not shown in FIG. 3, may be various diodes, Zener diodes, capacitors, inductors, and resistors to clamp voltages, minimize oscillations, and provide an optimal electrical pulse shape to initiate ignition within the cylinder.

The electrical characteristics of the spark gap 191 may be monitored by the auxiliary electrical circuit 322. It is advantageous to make these measurements in the primary section 302 because the voltages are lower in this section that the secondary section 304. Different varieties of auxiliary electrical circuit 322 may be used which can monitor voltage, current, resistance, or some other electrical property on spark gap 191. In some cases signal 320 may reflect a combination of multiple electrical properties of the spark gap and may be convolved with the response of other elements in circuit 300. An important aspect of signal 320 is that it may be used to distinguish between particular conditions within the cylinder, particularly between a HPES and LPES. A potential advantage of circuit 300 and signal 320 is that it may obviate the need for expensive proximity sensors to verify valve operation.

Figure 4:
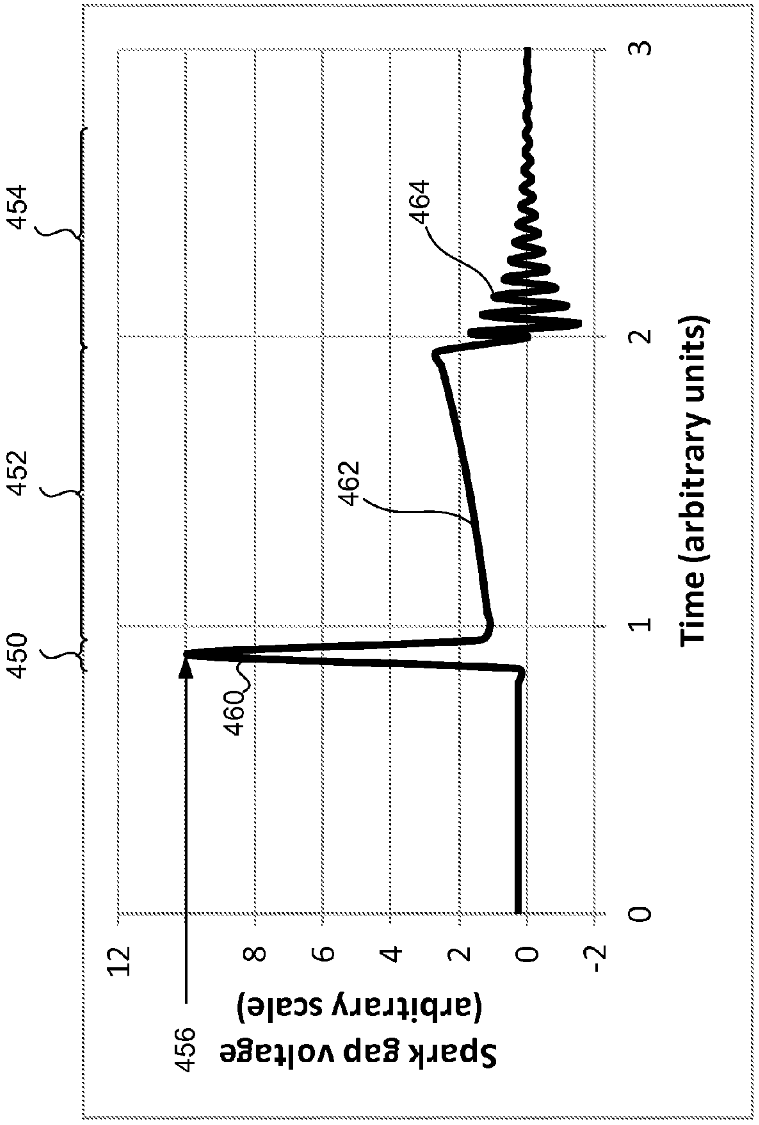
FIG. 4 is an exemplary plot of the voltage across the spark gap during a combustion event.

FIG. 4 shows an exemplary voltage waveform 460 across the spark gap 191 during a combustion event. The waveform may be divided into three phases corresponding to the fire phase 450, spark phase 452, and oscillatory phase 454, respectively. The waveform during these phases may be referred to as the fire line 460, spark line 462, and oscillatory line 464. During the fire phase 450 electrical breakdown in the spark gap occurs causing the nonconductive gases within the cylinder to become ionized. This requires a high voltage, the breakdown voltage 456, resulting in a sharp peak in the fire line 460. During the spark phase 452, which follows the fire phase, the spark line 462 may gradually rise. The characteristics in this phase are an interplay between many variables such as the cylinder load, type of fuel, air/fuel stoichiometry and details of electrical circuit 300 (FIG. 3). In the oscillatory phase 454, which follows the spark phase 452, the oscillatory line 464 rapidly oscillates due to ringing in the electrical circuit 300 (FIG. 3). It should be appreciated that the waveform 460 will vary depending on the cylinder operating conditions.

Electrical circuit 300 (FIG. 3) may be configured to provide a test spark 206 (FIG. 2) to monitor conditions within the cylinder. The test spark 206 may be arranged to occur substantially at or near top dead center of the crankshaft revolution after the combustion stroke 210 (FIG. 2). This corresponds to the time of maximum pressure within the cylinder as shown in FIG. 2. Timing of the test spark may be within timing windows of ±40°, ±30°, ±20°, ±10°, or ±5° around TDC. In some cases a test spark may be used outside of this timing window. Also, in some cases the test spark electrical characteristics may different than that used to fire the cylinder. Multiple test sparks or no test sparks may be used in a firing window. It should be appreciated that there will be no combustion event associated with the test spark, it is being used for test purposes only to determine whether a high pressure exhaust spring is present in the cylinder.

Figure 5:
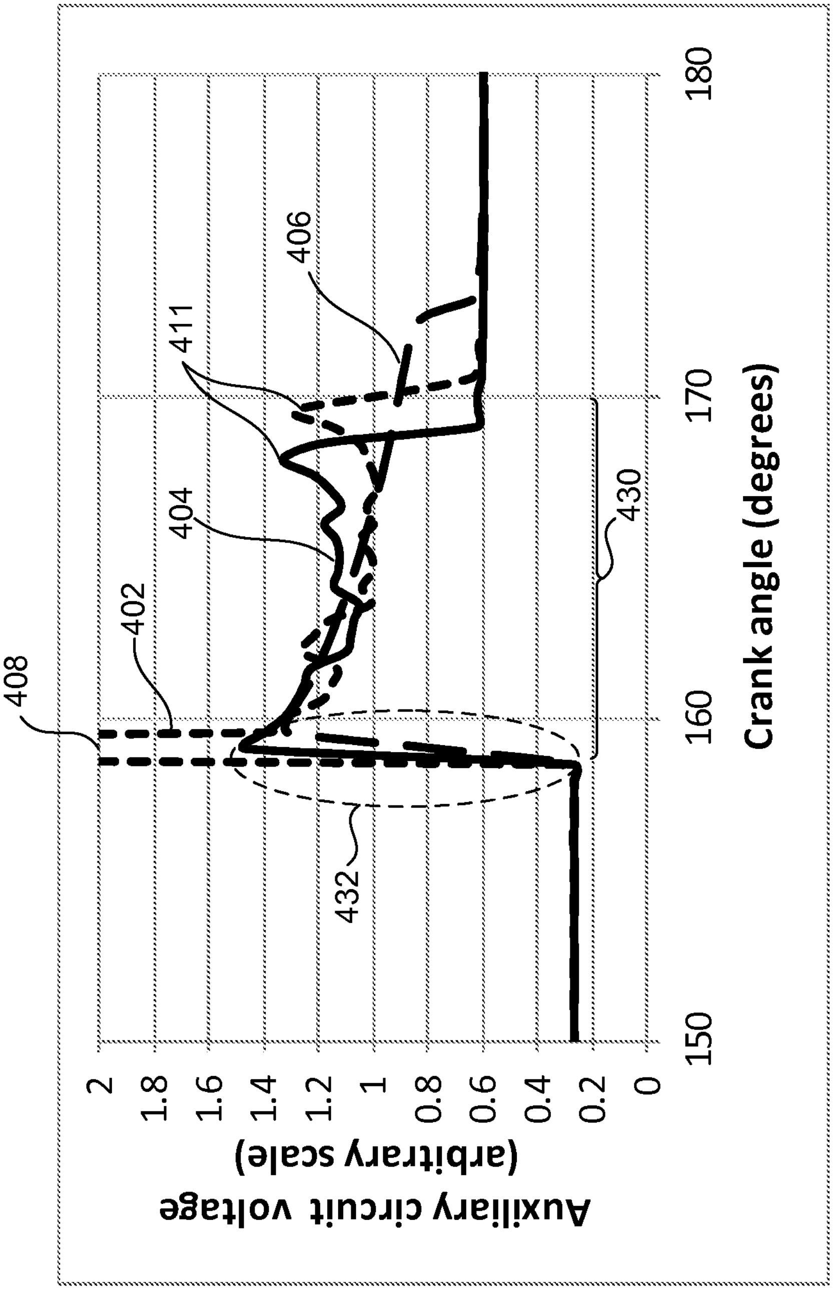
FIG. 5 is an exemplary plot of data taken from an auxiliary circuit monitoring the electrical characteristics of a spark gap under different conditions within a cylinder.

FIG. 5 shows measured electrical waveforms of the signal 320 output by auxiliary circuit 322 (FIG. 3) under various cylinder conditions. Three waveforms are shown. Waveform 402 represents the voltage waveform associated with a combustion event. Waveform 404 represents the voltage waveform associated with a high pressure exhaust spring. Waveform 406 represents the voltage waveform associated with a low pressure exhaust spring. The waveforms 402, 404, and 406 have several distinctive features which allow them to be differentiated from each other. Waveform 402 always has a voltage spike 408 reflecting the high voltage required to breakdown the air fuel mixture in the cylinder and initiate a spark (note the peak of this voltage spike is off scale in FIG. 5). This feature is analogous to the fire line 460 of FIG. 4. This voltage spike 408 is absent in both waveform 404 and 406. In some cases the inventors have observed a voltage spike 408 in the LPES case, but a high voltage spike has never been observed with a HPES. This can be attributed to the high temperature and pressure exhaust gases trapped in the cylinder in the HPES case having sufficient electrical conductivity so that a high voltage is not required to initiate electrical breakdown. Another distinction between waveforms 402, 404, and 406 is that waveforms 402 and 404 show an increase in the voltage near the end of the spark, whereas waveform 406 does not show this feature, denoted as a spark line tail spike 411. Using a combination of the voltage spike associated with the breakdown voltage and the absence or presence of a spark line tail spike allows an unambiguous classification of a top dead center event as corresponding to a high pressure exhaust spring, a low pressure exhaust spring, or a combustion event. Other attributes of the signal 320 waveform may be used to distinguish between these cases. For example, the duration of the spark 430 and the turn-on characteristics 432, may be distinguishing features in some cases.

While the differences between a HPES and LPES case are most pronounced at or near TDC, electrical measurements may be made at other crankshaft positions to assist in discriminating between the two cases. For example coil-based ion-detection methods may be used to measure the electrical properties of the cylinder gases at various crankshaft positions. This would require additional circuit elements and perhaps a different location for auxiliary circuit 322.

Figure 6:
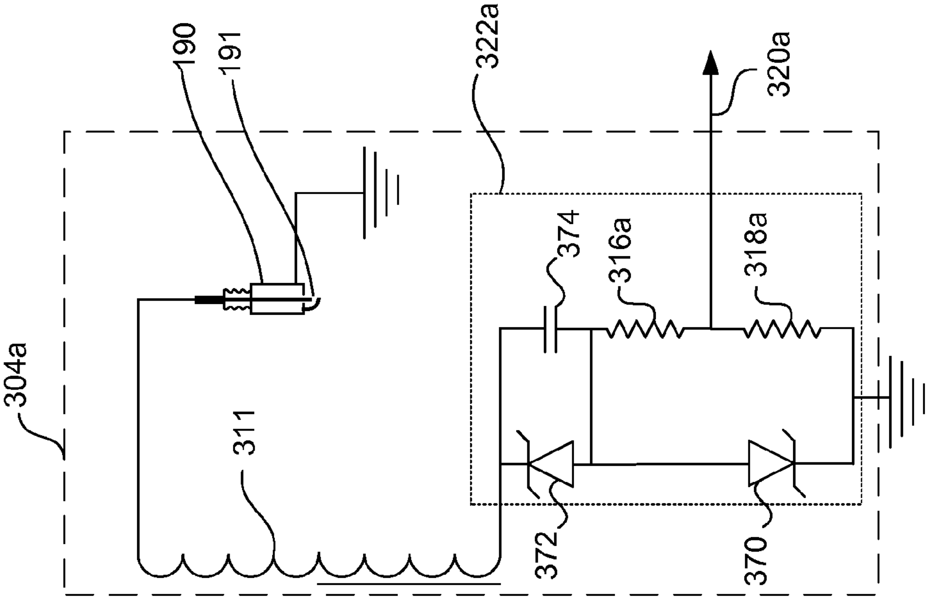
FIG. 6 is an alternative embodiment of an auxiliary circuit incorporated into the secondary section of the ignition circuitry.

FIG. 6 illustrates an alternative embodiment of an auxiliary circuit 322*a*. The secondary section 304*a* contains a spark plug 190, spark gap 191, and secondary coil 311 similar to those shown in FIG. 3. In addition secondary section 304*a* includes auxiliary circuit 322*a*. Auxiliary circuit 322*a* may contain two resistors 316*a* and 318*a*, which form a voltage divider. In addition auxiliary circuit 322*a* contains two Zener diodes 370 and 372 and a capacitor 374. A signal 320*a* may be taken between the two resistors 316*a* and 318*a* and directed to an engine controller (not shown in FIG. 6) or used in some manner to control the engine. In some cases multiple auxiliary circuits, such as both auxiliary circuits 322 and 322*a*, may be used to infer different electrical properties of the spark gap 191 (FIG. 3). It should be appreciated that auxiliary circuits 322 and 322*a* are illustrative only and the exact circuit layout, components used, and their values may vary depending on design details.

Differences in the electrical properties of the spark gap may also be useful in determining whether fueling has occurred. It may thus serve as a diagnostic on the fuel injector, which inputs fuel into the cylinder.

Other sensors can be used either individually or in cooperation with measurement of the spark gap electrical properties to determine whether a high pressure spring exists in a cylinder. These sensors include, but are not limited to, an intake manifold absolute pressure sensor, an intake manifold air flow sensor, an exhaust gas oxygen sensor, a crankshaft rotation sensor, a camshaft rotation sensor, and an exhaust manifold pressure sensor. Advantageously many of these sensors are already standard components on modem vehicles, so using them to monitor for a HPES incurs little additional expense.

An oxygen sensor may be used to infer whether a HPES is present in a cylinder. One or more exhaust oxygen sensors may monitor the oxygen content of the exhaust gases vented from the cylinder. An oxygen sensor with a fast time response may be able to isolate the gas flow from each cylinder and thus can be used to compare against values known to be appropriate for operation without HPES. Similarly an exhaust gas flow sensor could be used in an analogous manner to ascertain whether a cylinder has been vented.

An exhaust manifold absolute pressure sensor may be used to infer whether HPES is in the cylinder. The exhaust manifold pressure will quickly rise when an exhaust manifold has opened, and the timing of those pressure pulses can be compared against the values expected for LPES or HPES to ascertain whether a cylinder has been vented.

A HPES in a cylinder will cause a drop in the crankshaft rotational speed to do the work required to compress the gases within the cylinder. This drop can be detected using a crankshaft rotational speed sensor. In the case of a LPES there is less impact on the crankshaft rotational speed, since the pressure in the crankcase is close to or slightly greater than that in the cylinder. The differences in the rotational speed, or any time derivatives thereof, such as rotational acceleration, jerk, etc., may be used to distinguish between a LPES and HPES. The apparatus used to detect variations in the crankshaft rotational speed may be similar to those described in U.S. Provisional Patent Application Nos. 61/897,686 and/or 62/002,762, each of which is incorporated herein by reference in its entirety for all purposes. Similarly, with cam actuated valves, opening a valve will require work causing a change in the camshaft rotations speed of the camshaft. This speed change, or any time derivatives thereof, can be detected by a camshaft rotation sensor.

An intake manifold absolute pressure (MAP) sensor or an intake manifold air flow (MAF) sensor may also be used to infer whether a high pressure exhaust spring is present in a cylinder. Should the intake valve open or attempt to open against a high pressure spring gases from the cylinder will flow into the intake manifold. This gas inflow could be detected by either a MAP or MAF sensor.

In some embodiments, a signal indicating the presence of a high pressure exhaust spring may result in disablement of the intake valve so it remains closed. This will prevent any mechanical damage to the intake valve or any of its associated mechanical components. This signal may be used as part of a safety circuit as described in U.S. Provisional Patent Application Nos. 61/879,481 and 61/890,671, each of which is incorporated herein by reference in its entirety for all purposes. This safety circuit may override any other controller requirements, such as minimizing noise, vibration, and harshness (NVH) or providing the driver requested torque. This safety feature can be particularly useful in skip fire operation, since the average cylinder load for the fired cylinders is greater compared to that experienced in all cylinder operation. The cylinder pressures, like those shown in curve 202 of FIG. 2, are thus generally higher and the likelihood of damaging an intake valve opening into this high pressure is increased.

In some embodiments, the intake valve may only be allowed to open if a LPES has been detected indicating that the intake valve will be opening into a low pressure cylinder. In other embodiments, presence of a high pressure exhaust spring signal will cause the exhaust valve to open, venting the cylinder.

As indicated in the aforementioned embodiments, the detection of selected properties of the gases within a cylinder may be used to infer whether an exhaust or intake valve has opened properly. For example, one effective way to determine the nature of the gases within the cylinders at any time is to provide a pressure sensor for each cylinder to directly monitor the cylinder pressure. Generally, the pressure within the cylinder at any given time and/or the changes in cylinder pressure over a small window of time is highly indicative whether a high pressure spring 102, a low pressure spring 104 or an air spring 106 is present in the cylinder and is a very good indicator of the valve actuation status. Although pressure sensors work well for this purpose, they are not standard components in commercially available engines, and adding such pressure sensors is not always practical. Therefore, the Applicant has developed several other approaches to detecting the nature of the gases within a cylinder.

Various electrical characteristics of cylinder gases are quite different when combusted exhaust gases remain trapped in the cylinder, compared to when the combusted gases have been exhausted, and/or when an air charge is present in the cylinder. Thus, as previously discussed, a monitoring circuit (e.g., auxiliary circuits 322 and 322*a*) may be provided to monitor selected electrical characteristics of the gases within the cylinder at selected times during a working cycle. The resulting information can be used to infer whether the exhaust valve opened to release the exhaust gases. Many internal combustion engines already have an electrical component present in the combustion chamber in the form of a spark plug which can be used to monitor certain characteristics of the cylinder gases.

By way of example, U.S. Provisional Patent Application No. 61/925,157 filed Jan. 8, 2014, which is incorporated herein by reference, describes several arrangements for monitoring electrical properties of gases in the region of a spark gap to infer the conditions within a cylinder, which in turn can be used to infer whether an exhaust or intake valve has opened properly. In some embodiments, as noted above, an auxiliary electrical circuit added to the normal electrical circuit used to drive the cylinder spark is arranged to monitor electrical characteristics across a spark plug's spark gap. The measured electrical characteristics may be a voltage drop, a current leakage, ionization level, etc.

In various embodiments, as previously discussed, a test spark (i.e., a spark that is not intended to initiate combustion) is ignited across the plug's spark gap at selected times when uncombusted air and fuel is not in the cylinder. During a spark event, there will typically be a step change in the voltage across the gap. When low pressure is present within the cylinder, the voltage may go down during the spark event. In contrast, if a high pressure is present in the cylinder (which can be due to either a high pressure spring or a cylinder fire), the voltage across the spark gap may go up during a spark event. Therefore, monitoring the voltage drop across the spark gap during a test spark can be used to determine the nature of the cylinder's contents at the time of the test spark. One suitable time for conducting the spark test is when a piston is in the vicinity of top dead center during an exhaust stroke since the pressure is highest at that time. However, as previously mentioned, in some implementations it will be desirable to test earlier in the exhaust stroke to provide sufficient time to deactivate an intake valve in response to the detection of an unexpected high pressure exhaust spring.

Figure 7A:
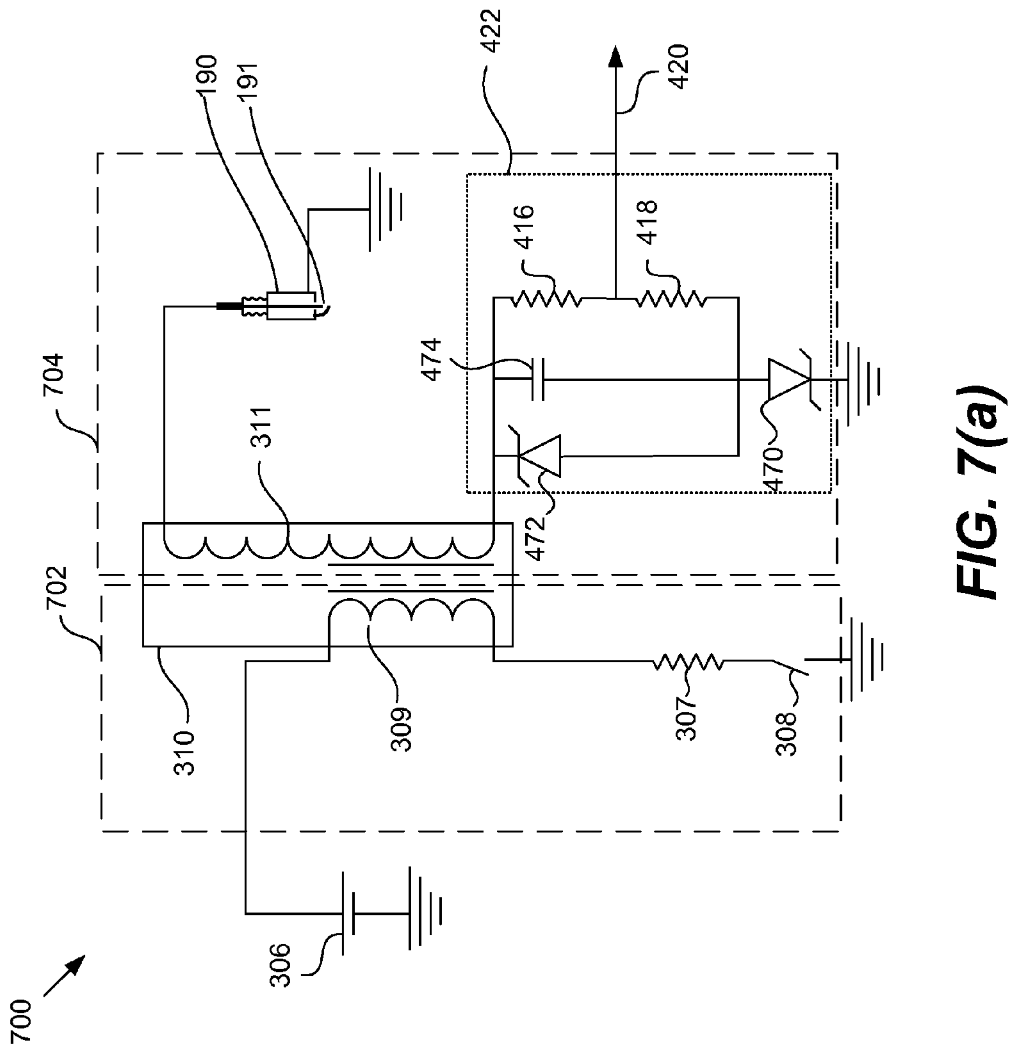
FIG. 7(*a*) is an alternative embodiment of an auxiliary circuit incorporated into the secondary section of the ignition circuitry.
Figure 7B:
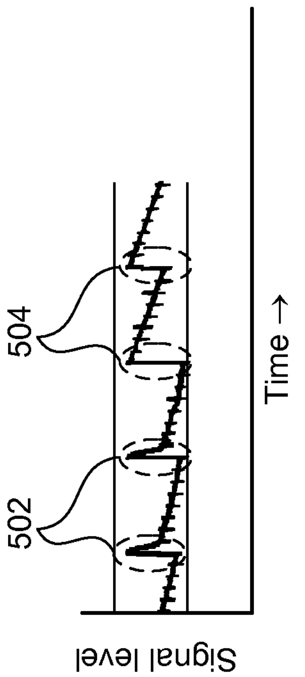
Figure 7C:
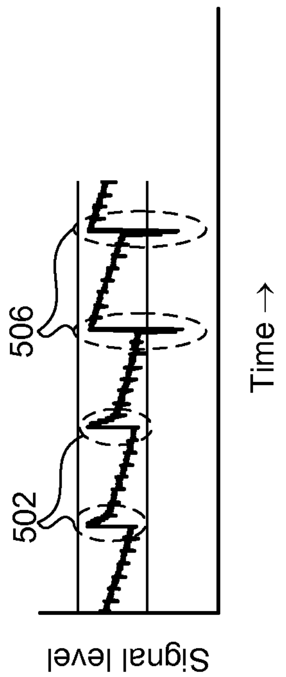

A few particular auxiliary circuits are described in FIGS. 3 and 6 and in the '157 application which is incorporated herein by reference. Yet another possible auxiliary circuit is illustrated in FIG. 7(*a*) of the present application. FIG. 7(*a*) shows an exemplary electrical circuit 700 that may be used to both drive the cylinder spark and measure the electrical properties of the cylinder gases. Each cylinder in a multi-cylinder engine may be equipped with an electrical circuit identical or similar to simplified electrical circuit 700, although this is not a requirement. Electrical circuit 700 can be divided into a primary section 702 and a secondary section 704. A switch 308 controls current flow from a battery 306 through the primary coil 309 of transformer 310. The switch may be a fast activating, solid state component such as a field effect transistor. Opening the switch 308 causes a rapid drop in the current through the primary coil 309 of transformer 310. This current may be limited by optional resistor 307, the resistance of the primary coil 309, or other factors. The sudden drop in current through primary coil 309 generates a high voltage on the secondary coil 311 of transformer 310. The high voltage appears across spark gap 191 of spark plug 190 causing electrical breakdown and generating a spark across the spark gap 191 that initiates combustion in cylinder. As mentioned earlier, a test spark may also be generated at other times in an engine cycle for sensing properties of gases within the cylinder.

Secondary section 704 includes an auxiliary monitoring circuit 422. In the illustrated embodiment, auxiliary circuit 422 contains two resistors 416 and 418, which form a voltage divider. In addition auxiliary circuit 422 contains two diodes, diode Zener 470 and Zener diode 472 and a capacitor 474. The Zener diode 472 may have a breakdown voltage in the range of 600 to 800 volts, although higher and lower voltages may be used. Zener diode 472 may consist of a series of individual Zener diodes. A signal 420 may be taken between the two resistors 416 and 418 and directed to an engine controller (not shown) or used in some manner to determine status within a cylinder. In particular, the change in the signal 420 during a spark may be used to infer the presence of a high or low pressure spring in the cylinder. The presence of high pressure in the cylinder, either from a high pressure exhaust spring or a combustion event, may be detected by a positive change in the voltage of signal 420. The presence of low pressure within the cylinder may be detected by a negative change in the voltage of signal 420. In other cases the sign of the change in the voltage of signal 420 may be similar, but the magnitude of the change may be different such that a high or low pressure spring may be detected. Variation in the voltage of signal 420 may be in the range of 50 to 100 V, although higher and lower changes may occur depending on the detailed implementation. In other cases more complex waveform signatures may be associated with the different cylinder conditions. FIG. 7(*b*) shows signal the level of signal 420 (FIG. 7(*a*)). The waveform associated with two normal firings 502 followed by two skips with a LPES 504. FIG. 7(*c*) shows the level of signal 420 with two fires 502 followed by two skips with a HPES 506. Inspection of the FIGS. 7(*b*) and 7(*c*) illustrates that the waveforms associated with these different cylinder scenarios are distinct. The differences in the waveforms can be sensed and incorporated into a circuit to detect the current cylinder status.

Figure 8:
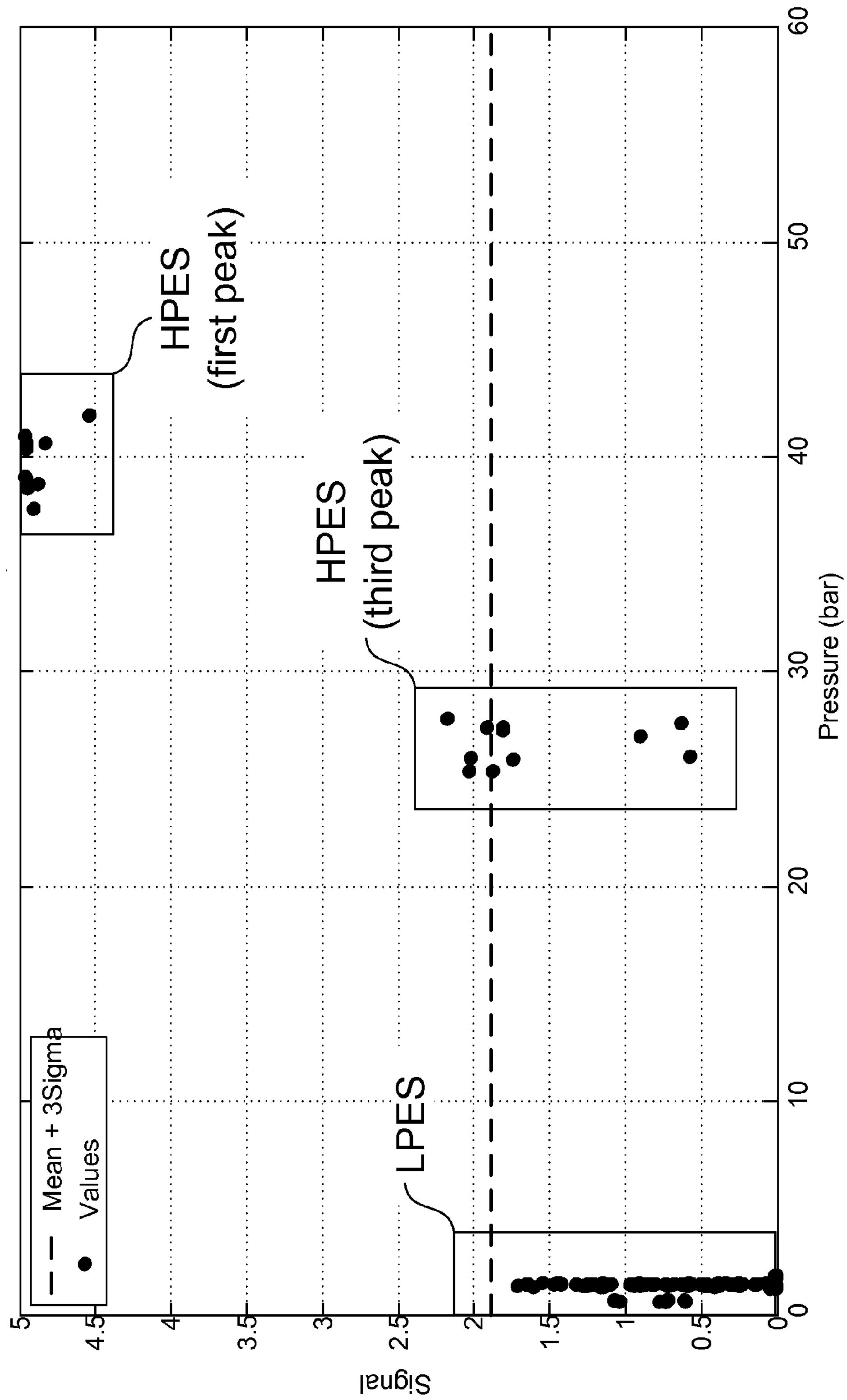
FIGS. 8 and 9 are graphs showing the ionization level of combusted gases in a cylinder according to one embodiment of the present invention.
Figure 9:
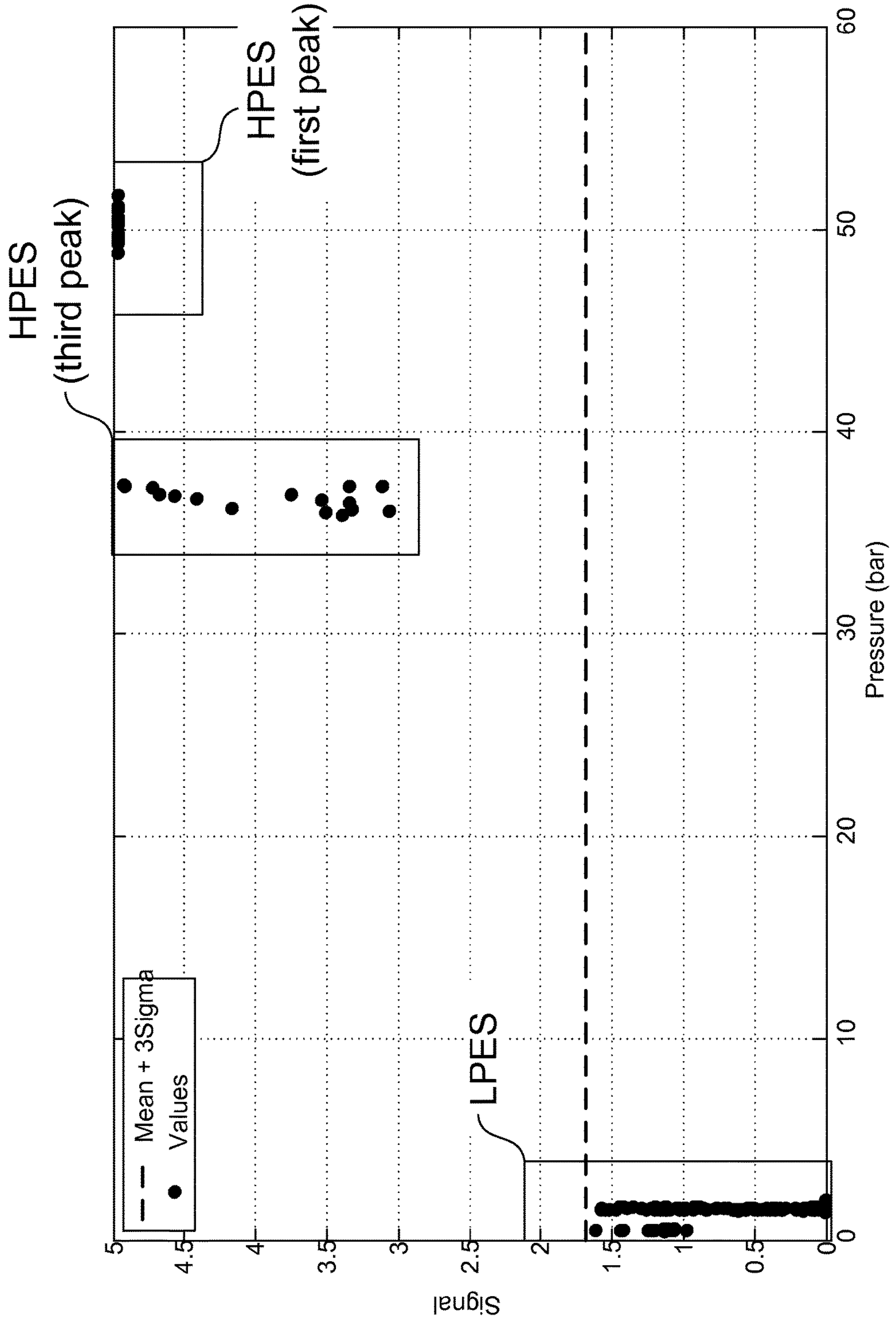

Yet another cylinder gas monitoring approach takes advantage of the fact that high temperature/high pressure exhaust gases tend to be ionized and therefore electrically conductive. Thus, the nature of the gases in the cylinder can be inferred by directly or indirectly detecting the relative ionization level of gases in the cylinder. FIGS. 8 and 9 illustrate the nature of this difference. Specifically, FIGS. 8-9 plot the ionization level and pressure level within a cylinder under different operating conditions (i.e. at different engine speeds and cylinder mass air charge (MAC)) as detected by an ion sensing coil. FIG. 8 corresponds to an engine speed of 1000 revolutions per minute (rpm), while FIG. 9 corresponds to a higher engine speed of 1750 rpm. FIG. 8 corresponds to a MAC of 550 mg, while FIG. 9 corresponds to a higher cylinder load of a 610 mg MAC. The upper 3σ (σ=standard deviation) value of the LPES signal distribution is also plotted.

As can be seen from these graphs, there are significant differences in ionization level between high pressure exhaust springs and low pressure exhaust springs. In FIGS. 8 and 9, the data points labeled "HPES First Peak" represent the ionization level observed as a piston approaches top dead center of the "exhaust" stroke immediately following a firing when the exhaust valve is held closed thereby resulting in a high pressure exhaust spring. In contrast, the data points labeled "LPES" represent the ionization level observed at the same piston location when the exhaust gases are discharged in a normal manner—which is reflective of the conditions during a low pressure exhaust spring. The differences in the ionization levels associated with high and low pressure exhaust springs can be seen by comparing the HPES First Peak data points to the LPES data points. In both figures there is a clear offset between the HPES First Peak data points and upper 3σ value of the LPES distribution allowing virtually unambiguous sensing of a HPES.

The data points labeled "HPES Third Peak" represent the ionization level observed in a high pressure exhaust spring one working cycle (two piston reciprocations) after the HPES First Peak. As can be seen by comparing the HPES First Peak data points to the HPES Third Peak data points, the ionization level tends to decay during subsequent reciprocations of the engine in a generally predictable way based on engine operating conditions. There is less decay in the HPES Third Peak data points in FIG. 9 than in FIG. 8 because the engine speed is greater in FIG. 9 and thus there is less time for decay between subsequent engine cycles.

Since, the ionization level associated with exhaust gases in a high pressure exhaust spring will be significantly higher than the ionization level of the cylinder gases associated with a low pressure gas spring or an air spring, the presence or absence of a high pressure gas spring can be detected by monitoring ionization levels or current leakage across the spark gap. The ionization levels may be detected using ion sensing coils or any other suitable ion sensors.

It should be also appreciated that any of the methods, operations and/or features (e.g., measuring an electrical property of a spark gap, etc.) described herein may be stored in a tangible computer readable medium in the form of executable computer code. The operations are carried out when a processor executes the computer code.

Although only a few embodiments of the invention have been described in detail, it should be appreciated that the invention may be implemented in many other forms without departing from the spirit or scope of the invention. For example, are also several references to the term, "cylinder." It should be understood that the term cylinder should be understood as broadly encompassing any suitable type of working chamber. Similarly, while a particular embodiment of an auxiliary electrical circuit to measure electrical properties of the spark gap had been described; many variations on this circuit may be employed. The figures illustrate a variety of devices, circuit designs and waveforms. If should be appreciated that these figures are intended to be exemplary and illustrative, and that the features and functionality of other embodiments may depart from what is shown in the figures. The present invention may also be useful in engines that do not use skip fire control. It may be incorporated into a vehicle's on board diagnostic (OBD) system to verify valve operation, detect cylinder misfires, cylinder knock, or any other combustion diagnostic. Therefore, the present embodiments should be considered illustrative and not restrictive and the invention is not to be limited to the details given herein.

What is claimed is:

1. A method of determining whether a high pressure exhaust spring is present in a cylinder of a spark ignition, internal combustion engine having a reciprocating piston, the method comprising:

measuring at least one electrical property of a spark gap in a cylinder; and based on the electrical property measurement, determining whether a high pressure exhaust spring is present in the cylinder.

2. A method as recited in claim 1 wherein a test spark is used to measure the at least one electrical property of the spark gap.

3. A method as recited in claim 2 wherein the at least one measured electrical property includes a first electrical property that occurs during a fire phase of the test spark.

4. A method as recited in claim 3 further comprising:

determining whether there is a voltage spike during the fire phase of the test spark that exceeds a predetermined threshold; and when it is determined that there is a voltage spike during the fire phase that exceeds the predetermined threshold, determining that a high pressure exhaust spring is not present in the cylinder.

5. A method as recited in claim 3 wherein the at least one measured electrical property includes a second property that involves a spark line tail spike.

6. A method as recited in claim 5 further comprising:

determining whether a spark line tail spike exceeds a predetermined threshold wherein the high pressure exhaust spring determination is based at least in part on the spark line tail spike determination.

7. A method as recited in claim 1 wherein the measurement is performed when a piston in the cylinder is substantially at a top dead center position, wherein the top dead center piston position corresponds to the top dead center piston position immediately following a power stroke.

8. A method as recited in claim 1 wherein an additional one or more sensors are used in coordination with the measurement of the electrical property of the spark gap to determine whether a high pressure exhaust spring is present in the cylinder and wherein the one or more sensors involve at least one selected from the group consisting of an intake manifold absolute pressure sensor, an intake manifold air flow sensor, an exhaust gas oxygen sensor, a crankshaft rotation sensor, a camshaft rotation sensor and an exhaust manifold pressure sensor.

9. A method as recited in claim 2 wherein the test spark occurs within a time window selected from the group consisting of ±40°, ±30°, ±20°, ±10°, and ±5° from top dead center.

10. A method as recited in claim 1 wherein a high pressure exhaust spring is a cylinder state in which an exhaust valve is not opened during an exhaust stroke after combustion in the cylinder, thereby causing the cylinder to retain high pressure exhaust gases generated by the combustion.

11. A method as recited in claim 1 wherein the measurement of the at least one electrical property is performed using an auxiliary circuit that is coupled with an electrical circuit that drives a cylinder spark.

12. A method as recited in claim 11 wherein the auxiliary circuit includes voltage dividing resistors and wherein the measurement involves monitoring a voltage between the resistors.

13. A method as recited in claim 1 further comprising:

based on the measured at least one electrical property, determining that a high pressure exhaust spring is present in the cylinder; and in response to the determination, performing at least one selected from the group consisting of disabling an intake valve for the cylinder and opening an exhaust valve for the cylinder.

14. A method as recited in claim 1 further comprising:

based on the measured at least one electrical property, determining that a low pressure exhaust spring is present in the cylinder; and in response to the determination, allowing an intake valve for the cylinder to open.

15. A control system for an internal combustion engine operating in a skip fire manner, each cylinder having at least one intake valve and at least one exhaust valve, the control system comprising:

an electrical circuit arranged to generate a test spark across a spark gap in a cylinder; and a cylinder control module that is arranged to measure at least one electrical property of the spark gap to determine whether there is a high pressure exhaust spring in the cylinder.

16. A control system as recited in claim 15 wherein the cylinder control module is arranged to measure the at least one electrical property of the spark gap when a piston in the cylinder is at substantially a top dead center position immediately following a power stroke.

17. A control system as recited in claim 15 wherein the at least one measured electrical property includes a first electrical property that occurs during a fire phase of the test spark.

18. A control system as recited in claim 17 wherein the at least one measured electrical property includes a second property that involves a spark line tail spike.

19. A control system as recited in claim 15 wherein the cylinder control module, based on the electrical property measurement, is further arranged to:

determine that a high pressure exhaust spring is present in the cylinder; and based on the high pressure exhaust spring determination, perform at least one selected from the group consisting of disabling an intake valve for the cylinder and opening an exhaust valve for the cylinder.

* * * * *